(12) United States Patent
Form et al.

(10) Patent No.: US 7,760,889 B2
(45) Date of Patent: Jul. 20, 2010

(54) SPEECH SUPPORT SYSTEM FOR A VEHICLE

(75) Inventors: Thomas Form, Braunschweig (DE); Carsten Bergmann, San Jose, CA (US)

(73) Assignee: Volkswagen AG, Wolfsburg (DE)

( * ) Notice: Subject to any disclaimer, the term of this patent is extended or adjusted under 35 U.S.C. 154(b) by 1351 days.

(21) Appl. No.: 11/200,846

(22) Filed: Aug. 10, 2005

(65) Prior Publication Data

US 2006/0034466 A1 Feb. 16, 2006

Related U.S. Application Data

(60) Provisional application No. 60/600,268, filed on Aug. 10, 2004.

(51) Int. Cl.
*H04B 1/00* (2006.01)
(52) U.S. Cl. .......................... 381/86; 381/85
(58) Field of Classification Search .................. 381/24, 381/26, 59, 71.4, 77–89, 90, 91, 92, 95, 96, 381/111–117, 122, 168, 175, 300, 302, 332, 381/365, 375, 389
See application file for complete search history.

(56) References Cited

U.S. PATENT DOCUMENTS

| | | | | |
|---|---|---|---|---|
| 5,185,803 | A * | 2/1993 | Moyski et al. | 381/86 |
| 6,363,156 | B1 * | 3/2002 | Roddy | 381/86 |
| 6,505,057 | B1 * | 1/2003 | Finn et al. | 455/569.2 |
| 7,010,129 | B1 | 3/2006 | Schaaf | 381/93 |
| 7,415,116 | B1 * | 8/2008 | Fels, Peter | 381/86 |

FOREIGN PATENT DOCUMENTS

| | | |
|---|---|---|
| DE | 3925589 | 2/1991 |
| DE | 4106405 | 9/1991 |
| DE | 19705471 | 7/1997 |
| DE | 19958836 | 5/2001 |
| EP | 078014 | 10/1982 |
| EP | 1077013 | 2/2001 |
| WO | 9734290 | 9/1997 |
| WO | 0221817 | 3/2002 |
| WO | 02069487 | 9/2002 |

* cited by examiner

*Primary Examiner*—Fan Tsang
*Assistant Examiner*—Akelaw A Teshale
(74) *Attorney, Agent, or Firm*—King & Spalding L.L.P.

(57) ABSTRACT

A speech support system for a vehicle with a first microphone and second microphone and a third microphone, as well as with a first loudspeaker, a second loudspeaker and a third loudspeaker, in which, by means of the speech support system, can maintain one communication path each from the first microphone to the second loudspeaker and/or from the first microphone to the third loudspeaker, as well as from the second microphone to the third loudspeaker and from the third microphone to the second loudspeaker. By means of the speech support system, a communication path can selectively be maintained from the first microphone to a telephone, and a communication path from telephone to the first loudspeaker, while maintaining communication path from the second microphone to the third loudspeaker and the communication path from the third microphone to the second loudspeaker.

14 Claims, 4 Drawing Sheets

SPEECH SUPPORT SYSTEM FOR A VEHICLE

CROSS-REFERENCE TO RELATED APPLICATION

This application claims priority to U.S. Provisional Patent Application No. 60/600,268, which was filed on Aug. 10, 2004, and is incorporated herein by reference in its entirety.

TECHNICAL FIELD

The invention concerns a speech support system for a vehicle with a first microphone, a second microphone and a third microphone, as well as a first loudspeaker, a second loudspeaker and a third loudspeaker.

This type of system is known from DE 199 58 836 A1. DE 199 58 836 A1 discloses a method for communication in a vehicle, in which the speech signals of the occupants of the vehicle are recorded separately via a microphone assigned to each occupant at his seat, the recorded speech signals for each occupant are separately amplified in an input stage and filtered for start level minimization and frequency adjustment, in which case the amplified and filtered speech signals of each individual occupant are subjected to individual signal processing in the form of a travel time correction and level differentiation for division on the output channels and therefore division to the individual components of a speech output device, consisting of loudspeakers, in one process step as a function of local assignment of the microphone in the vehicle, via which this speech signal was recorded, and as a function of local assignment of each individual loudspeaker of the speech output device in the vehicle, via which the speech signals are to be output, via a summing and distribution stage, and in which assignment of the speech signal individually processed for each output channel to the individual output channels, and therefore to the individual loudspeakers of the speech output device, occurs via an adjustment stage, in which an adjustment of the corresponding speech signal to the spatial conditions of the vehicle and the desired volume occurs, adjusted to each output channel, and therefore to each loudspeaker of the speech output device, via level adjustment and frequency adjustment.

A speech support system with a telephone connection is also known from U.S. Pat. No. 6,505,057 B1.

SUMMARY

The task of the invention is to provide an improved speech support system for a vehicle. It is particularly desirable to improve telephoning in a vehicle.

The aforementioned task is solved by a speech support system for a vehicle with a first microphone, a second microphone and a third microphone, as well as with a first loudspeaker, a second loudspeaker and a third loudspeaker, in which, by means of the speech support system, one communication path each can be maintained especially simultaneously, from the first microphone to the second loudspeaker and/or from the first microphone to the third loudspeaker and from the second microphone to the third loudspeaker and from the third microphone to the second loudspeaker, and in which, by means of the speech support system, a communication path can be maintained selectively from the first microphone to a telephone and from the telephone to the first loudspeaker, while maintaining the communication path from the second microphone to the third loudspeaker and the communication path from the third microphone to the second loudspeaker.

The aforementioned task is also solved by a speech support system for a vehicle having at least a first seat, a second seat and a third seat, in which a first loudspeaker and a first microphone are assigned to the first seat, a second loudspeaker and a second microphone to the second seat and a third loudspeaker and a third microphone to the third seat, in which, by means of the speech support system, a first microphone signal, recordable by the first microphone, can be output to the second loudspeaker, to the third loudspeaker or to the second loudspeaker and the third loudspeaker, in which, by means of the speech support system, a second microphone signal, recordable by the second microphone, can be output to the first loudspeaker, to the third loudspeaker or to the first loudspeaker and the third loudspeaker, in which, by means of the speech support system, a third microphone signal, recordable by the third microphone, can be output to the second loudspeaker, to the first loudspeaker or to the second loudspeaker and the first loudspeaker, in which, by means of the speech support system, the first microphone signal can selectively be output to a telephone and a telephone signal that can be output by the telephone can be output to the first loudspeaker, in which the second microphone signal can be output to the third loudspeaker, but especially not to the first loudspeaker, and in which the third microphone signal can be output to the second loudspeaker, but especially not to the first loudspeaker.

In an advantageous embodiment of the invention, by means of the speech support system, the second microphone signal can be output selectively to the telephone and the telephone signal that can be output by the telephone can be output to the second loudspeaker, in which the first microphone signal can be output to the third loudspeaker, but especially not to the second loudspeaker, and in which the third microphone signal can be output to the first loudspeaker, but especially not to the second loudspeaker.

In another advantageous embodiment of the invention, by means of the speech support system, the third microphone signal can selectively be output to the telephone and the telephone signal that can be output from the telephone can be output to the third loudspeaker, in which the first microphone signal can be output to the second loudspeaker, but especially not to the third loudspeaker, and in which the second microphone signal can be output to the first loudspeaker, but especially not to the third loudspeaker.

In another advantageous embodiment of the invention, the speech support system includes an operating element for alternating connection of the first microphone and the first loudspeaker to the telephone, for alternating connection of the second microphone and the second loudspeaker to the telephone and/or for alternating connection of the third microphone and the third loudspeaker to the telephone.

In another advantageous embodiment of the invention, a tactile, optic and/or acoustic confirmation of successful operation of the operation element can be generated by means of the speech support system.

A speech support system according to the invention is supposed to be or include especially a communications or speech/counter-speech device.

Vehicle according to the invention is especially a ground vehicle, usable individually in traffic. The vehicles according to the invention are especially not restricted to ground vehicles with an internal combustion engine.

BRIEF DESCRIPTION OF THE DRAWINGS

Additional advantages and details are apparent from the following description of practical examples. In it.

DETAILED DESCRIPTION

Figure 1:
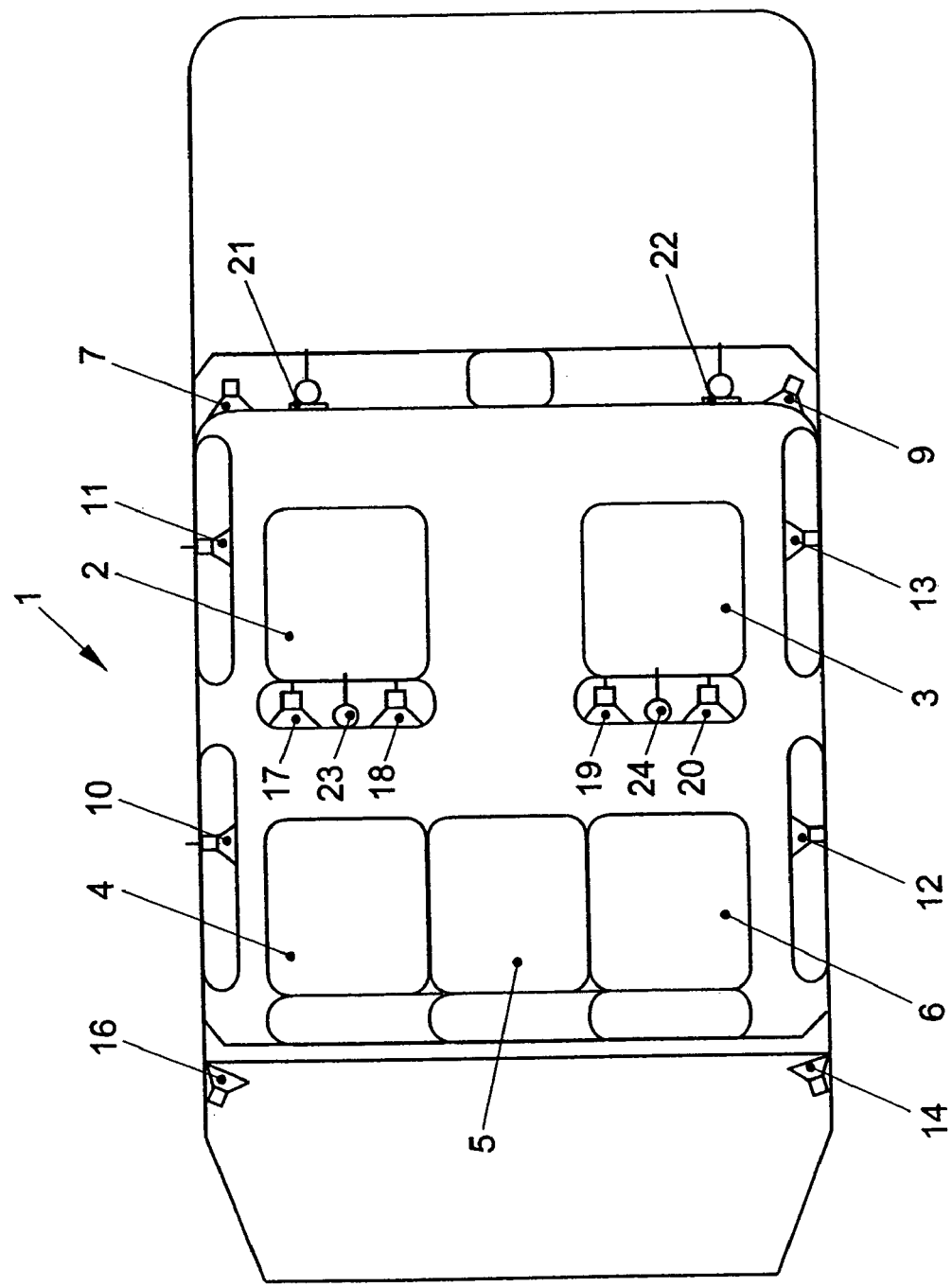
FIG. 1 shows an internal view of a vehicle.

FIG. 1 shows the internal view of the vehicle 1 from the top. Reference numbers 2 and 3 denote the front seat and reference numbers 4, 5 and 6 the back seats of the vehicle 1. Reference numbers 7, 9, 10, 11, 12, 13, 14, 16, 17, 18, 19 and 20 denote loudspeakers. Reference numbers 21, 22, 23 and 24 denote microphones. The loudspeakers 7, 9, 10, 11, 12, 13, 14, 16, 17, 18, 19 and 20 belong partially to a music and partially to a speech support system. They can also be used by both systems. The microphone 21 and loudspeaker 7 or/and 11 are assigned to front seat 2. Microphone 22 and loudspeaker 9 or/and 13 are assigned to front seat 3. Microphone 23 and loudspeakers 10, 16, 17 or/and 18 are assigned to rear seat 4. Microphone 24 and loudspeakers 12, 14 19 or/and 20 are assigned to rear seat 6. A correspondingly adjusted speech support system can also be prescribed, in that rear seat 5 is included. A correspondingly adjusted speech support system for inclusion for additional rows of seats can also be prescribed.

The microphones 21, 22, 23 and 24 can be arranged on the backs of a seat, on the dashboard or in the roof.

The speech support system approves verbal communication between occupants of the vehicle by recording speech, by means of microphones 21, 22, 23 and 24 and (optionally amplified and/or filtered) output through loudspeakers 7, 9, 10, 11, 12, 13, 14, 16, 17, 18, 19 and 20 or part of the loudspeakers 7, 9, 10, 11, 12, 13, 14, 16, 17, 18, 19 and 20. The principle of the speech support systems is disclosed by DE 199 58 836 A1 and U.S. Pat. No. 6,505,057 B1, among others.

Figure 2:
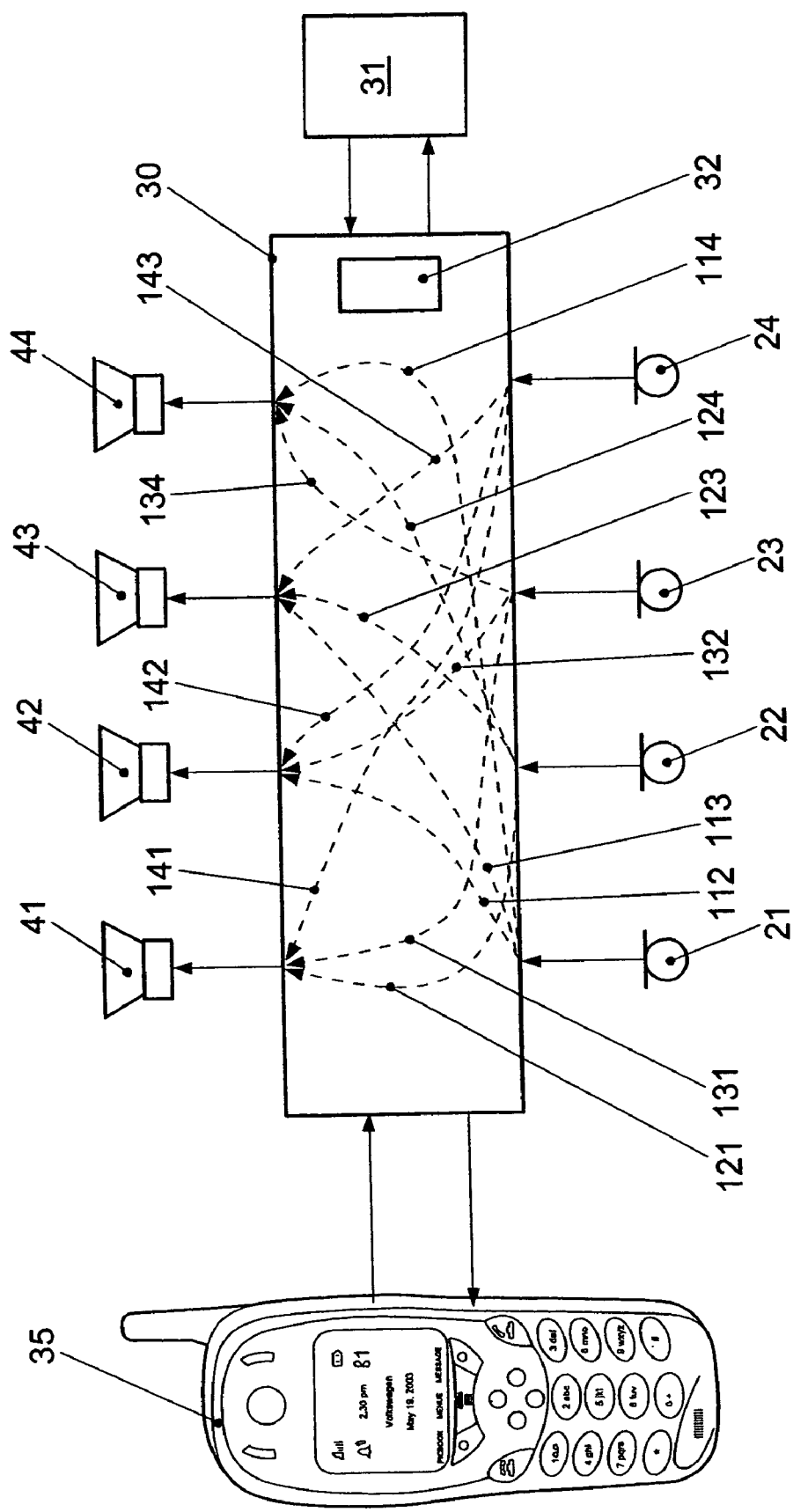
FIG. 2 shows a speech support system in a first state.
Figure 3:
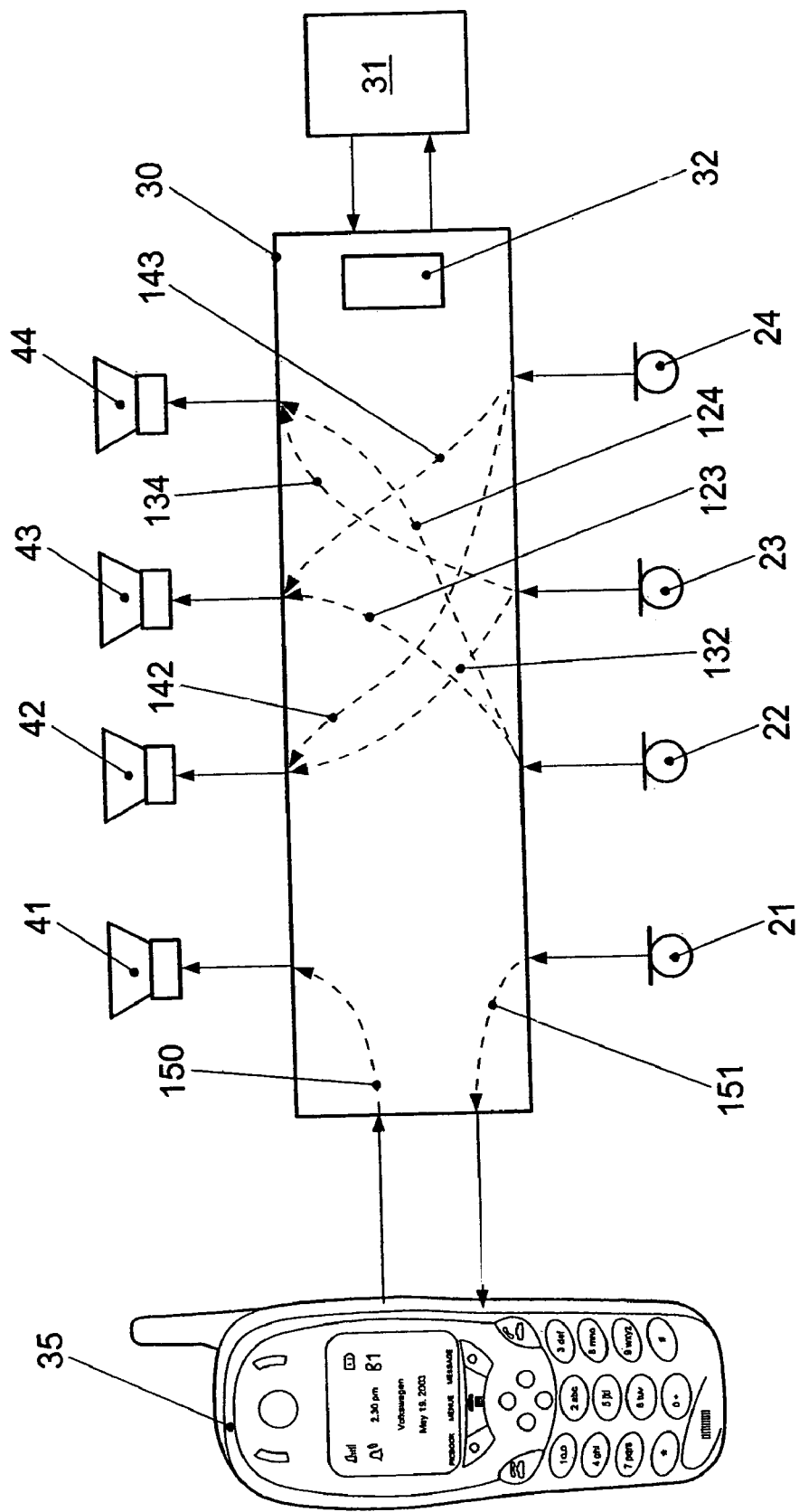
FIG. 3 shows the speech support system according to FIG. 2 in a second state and FIG. 4 shows the speech support system according to FIG. 2 in a third state.
Figure 4:
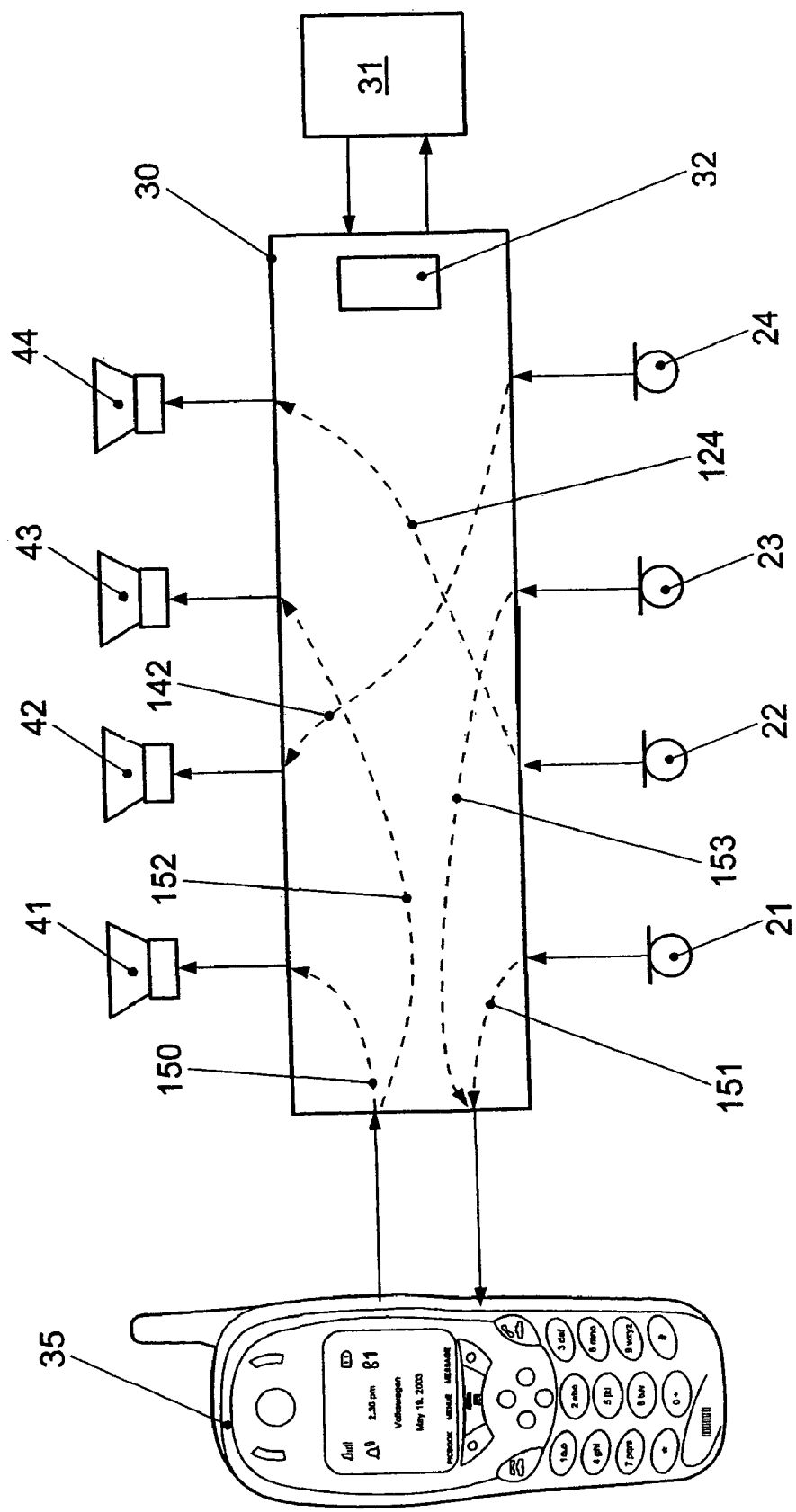

FIG. 2 shows the speech support system in a first state, FIG. 3 shows the speech support system in a second state and FIG. 4 shows the speech support system in a third state. The speech support system includes a speech control 30, connection to microphones 21, 22, 23 and 24. This speech control 30 is also connected to some or all of the loudspeakers 7, 9, 10, 11, 12, 13, 14, 16, 17, 18, 19 and 20. A loudspeaker denoted with the reference number 41 in FIG. 2 therefore symbolizes loudspeaker 7 or/and 11, a loudspeaker denoted with reference number 42 denotes loudspeaker 9 or/and 13, a loudspeaker denoted with reference number 43 denotes loudspeakers 10, 16, 17 or/and 18 and a loudspeaker denoted with reference number 54 denotes loudspeakers 12, 14, 19 or/and 20.

In the first state, the speech control 30 and therefore the speech control system maintains a communication path 112 from microphone 21 to loudspeaker 42, a communication path 113 from microphone 21 to loudspeaker 43, a communication path 114 from microphone 21 to loudspeaker 44, a communication path 121 from microphone 22 to loudspeaker 41, a communication path 123 form microphone 22 to loudspeaker 43, a communication path 124 from microphone 22 to loudspeaker 44, a communication path 131 from microphone 23 to loudspeaker 41, a communication path 132 from microphone 22 to loudspeaker 42, a communication path 134 from microphone 23 to loudspeaker 44, a communication path 141 from microphone 24 to loudspeaker 41, a communication path 142 from microphone 24 to loudspeaker 42 and communication path 143 from microphone 24 to loudspeaker 43. This means a microphone signal (speech signal or acoustic signal) recorded by microphone 21 is output by loudspeakers 42, 43 and 44, a microphone signal recorded by microphone 22 (speech signal or acoustic signal) is output by loudspeakers 41, 43 and 44, a microphone signal recorded by microphone 23 (speech signal or acoustic signal) is output by loudspeakers 41, 42 and 44 and a microphone signal recorded by microphone 24 (speech signal or acoustic signal) is output by loudspeakers 41, 42 and 43.

The speech control 30 is shown simplified in FIG. 2, FIG. 3 and FIG. 4. Thus, the speech control 30 includes filters and/or amplifiers (not shown). In addition, a feedback compensation and/or interfering noise suppression (not shown) are additionally provided. Practical examples of such systems that can be implemented in the speech control 30, as well as especially additional speech support systems, are disclosed, for example, in EP 0078014 B1, WO 97/34290, DE 197 05 471 A1, DE 41 06 405 C2, DE 199 58 836 A1, DE 39 25 589 A1, EP 1 077 013 B1, WO 02/069487 and WO 02/21817.

A telephone 35 is assigned to the speech support system. The telephone 35 can be a mobile telephone, connectable to the speech control 30, for example, by means of a Bluetooth interface, or a telephone integrated in the vehicle 1. The telephone 35 can also be integrated in the speech control 30.

The speech support system also has an operating element 31 for assignment of a telephone conversation to one or more of the seats 2, 3, 4 and 6 of vehicle 1. If, for example, a person occupying the front seat 2 wishes to use telephone 35, this person can conduct a telephone conversation from front seat 2 by operating element 31. In this case, the speech support system is transferred from the first state, depicted in FIG. 2, to the second state, depicted in FIG. 3. The communication paths 112, 113, 114, 121, 131 and 141 are then interrupted and a communication path 151 is made and maintained from microphone 21 to telephone 35 and a communication path 150 from telephone 55 to loudspeaker 41, while maintaining communication paths 123, 124, 132, 134, 142 and 143. In this way, the infrastructure of the speech support system is used, with reference to the front seat 2, as an open speech device, while maintaining speech support, with reference to seats 3, 4 and 6. In an advantageous embodiment, a tactile, optical and/or acoustic confirmation of successful operation of operating element 31 can be generated. For example, the operating element can generate a tactile feedback. As an alternative or in addition, a light or display can be assigned to the operating element, indicating (for example, as a blinking LED) that the communication paths 150 and 151 exist. As an additional alternative or in addition, an acoustic confirmation can be output by means of loudspeaker 41, for example, as a crack.

As an alternative or in addition to operating element 31, an acoustic command recognition 32 can be provided for recognition of acoustic commands. It can be prescribed that the speech support system is transferred from the first state, depicted in FIG. 2, to the second state, depicted in FIG. 3, if the acoustic command "TELEPHONE" is received by the microphone.

Other operating elements corresponding to operating element 31 can also be provided, by means of which persons in other seats 3, 4 or 6 can use telephone 35 alternatively or in addition in the aforementioned manner.

Thus, it can be prescribed that a person in front seat 3 can use telephone 35 alone by operating a corresponding operating element. In this case, the communication paths 121, 123, 124, 112, 132 and 142 are interrupted and a communication path is created and maintained from microphone 22 to telephone 35 and from telephone 35 to loudspeaker 42, while maintaining communication paths 113, 114, 131, 134, 141 and 143. In this way, the infrastructure of the speech support system, with reference to front seat 3, is used as an open speech device, while maintaining the speech support, with reference to seats 2, 4 and 6. The procedure can also occur accordingly, with reference to rear seat 4 and rear seat 6.

It is also possible for all occupants of the vehicle to participate in a telephone conversation. It is also possible for several occupants of the vehicle to participate in a telephone conversation, while others use the speech support system for speech support.

If, for example, a person occupying rear seat 4 wishes to participate in the telephone conversation, described with reference to FIG. 3, this person can be involved in the telephone conversation assigned to front seat 2 by operating element 31 or a corresponding operating element. In this case, the speech support system is switched from the second state, depicted in FIG. 3, to the third state, depicted in FIG. 4. In this case, in addition to the interrupted communication paths 112, 113, 114, 121, 131 and 141, the communication paths 123, 132, 134 and 143 are interrupted and a communication path 153 is created and maintained for microphone 23 to telephone 35 and a communication path 152 from telephone 35 to loudspeaker 43, while maintaining communication paths 124 and 142. In this way, the infrastructure of the speech support system, with reference to front seat 2 and rear seat 4, is used as an open speech device, while maintaining speech support, with reference to front seat 3 and rear seat 6. In an advantageous embodiment, a tactile, optical and/or acoustic confirmation could be generated during successful operation of the operating element.

The communication paths 112, 113, 114 and 151 indicate the path of a microphone signal, recordable by microphone 21 through the speech control 30. The communication paths 121, 123, 124 and 153 indicate the path of a microphone signal, recordable by microphone 22 through speech control 30. The communication paths 131, 132 and 134 indicate the path of a microphone signal, recordable by microphone 23 through speech control 30. The communication paths 141, 142 and 143 indicate the path of a microphone signal, recordable by microphone 24 through speech control 30. The communication paths 150 and 152 indicate the path of a telephone signal that can be generated by telephone 35 through speech control 30.

The elements in the figures are not necessarily drawn to scale, in the interest of simplicity and clarity. For example, the orders of magnitude of some elements are exaggerated relative to other elements, in order to improve understanding of the practical examples of the present invention.

What is claimed is:

1. A speech support system for a vehicle comprising:
   a first microphone,
   a second microphone,
   a third microphone,
   a fourth microphone,
   a first loudspeaker,
   a second loudspeaker,
   a third loudspeaker, and
   a fourth loudspeaker,
   wherein in a first state of the speech support system, first communication paths are maintained from the first microphone to the second, third, and fourth loudspeakers, second communication paths are maintained from the second microphone to the first, third, and fourth loudspeakers; third communication paths are maintained from the third microphone to the first, second, and fourth loudspeakers the second loudspeaker, and fourth communication path are maintained from the fourth microphone to the first, second, and third loudspeakers, wherein, of the speech support system is operable to switch to a second state of the speech support system in which the first communication paths are interrupted and substituted with communication paths from the first microphone to a telephone and from the telephone to the first loudspeaker, the second communication paths are interrupted and substituted with communication paths from the second microphone to the telephone and from the telephone to the second loudspeaker, and the third and fourth communication paths to the first and second loudspeakers are interrupted, while maintaining the third and fourth communication paths between the third and fourth microphones and the third and fourth loudspeakers.

2. A speech support system according to claim 1, wherein, by means of the speech support system, the second microphone signal can be selectively output to the telephone and the telephone signal that can be output from the telephone can be output to the second loudspeaker, wherein the first microphone signal can be output to the third loudspeaker and the fourth loudspeaker, but not to the second loudspeaker, the third microphone signal can be output to the first loudspeaker and the fourth loudspeaker, but not to the second loudspeaker, and the fourth microphone signal can be output to the first loudspeaker and the third loudspeaker, but not to the second loudspeaker.

3. A speech support system according to claim 1, wherein, by means of the speech support system, the third microphone signal can alternately be output to the telephone and the telephone signal that can be output by telephone can be output to the third loudspeaker, wherein the first microphone signal can be output to the second loudspeaker and the fourth loudspeaker, but not to the third loudspeaker, the second microphone signal can be output to the first loudspeaker and the fourth loudspeaker, but not to the third loudspeaker, and the fourth microphone signal can be output to the first loudspeaker and the second loudspeaker, but not to the third loudspeaker.

4. A speech support system according to claim 1, wherein the system includes an operating element for selective connection of the first microphone and the first loudspeaker to the telephone, for selective connection of the second microphone and the second loudspeaker to the telephone, for selective connection of the third microphone and a third loudspeaker of the telephone, and for selective connection of the fourth microphone and a fourth loudspeaker of the telephone.

5. A speech support system according to claim 4, wherein, by means of the speech support system, a tactile, optical and/or an acoustic confirmation of successful operation of operating element can be generated.

6. A speech support system for a vehicle, comprising:
   at least a first seat,
   a second seat,
   a third seat,
   a fourth seat,
   a first loudspeaker and a first microphone assigned to the first seat,
   a second loudspeaker and a second microphone assigned to the second seat,
   a third loudspeaker and a third microphone assigned to the third seat, and
   a fourth loudspeaker and a fourth microphone assigned to the fourth seat, wherein:
   a first microphone signal, recordable by the first microphone, can be selectively, by means of the speech support system, output to any of the second loudspeaker and, the third loudspeaker, and the fourth loudspeaker, a second microphone signal, recordable by the second microphone, can be selectively, by means of the speech support system, output to any of the first loudspeaker, the third loudspeaker, and the fourth loudspeaker, a third microphone signal, recordable by the third microphone, can be selectively, by means of the speech support system, output to any of the first loudspeaker, the second loudspeaker and the fourth loudspeaker, and a fourth microphone signal, recordable by the third microphone, can be selectively, by means of the speech support system, output to any of the first loudspeaker, the second loudspeaker, and the third loudspeaker, and wherein in a first state of the speech support system for assisting persons in the first and second seats to participate in a telephone communication:

the first and second microphone signals are selectively, by means of the speech support system, output to a telephone and signals from the telephone are output to the first and second loudspeakers loudspeaker, the forth microphone signal is selectively, by means of the speech support system, output to the third loudspeaker, but not to the first and second loudspeakers, and the third microphone signal is selectively, by means of the speech support system, output to the fourth loudspeaker, but not to the first and second loudspeakers.

7. A speech support system according to claim 6, wherein, by means of the speech support system, the third microphone signal can alternately be output to the telephone and the telephone signal that can be output by telephone can be output to the third loudspeaker, wherein the first microphone signal can be output to the second loudspeaker and the fourth loudspeaker, but not to the third loudspeaker, the second microphone signal can be output to the first loudspeaker and the fourth loudspeaker, but not to the third loudspeaker, and the fourth microphone signal can be output to the first loudspeaker and the second loudspeaker, but not to the third loudspeaker.

8. A speech support system according to claim 6, wherein the system includes an operating element for selective connection of the first microphone and the first loudspeaker to the telephone, for selective connection of the second microphone and the second loudspeaker to the telephone, for selective connection of the third microphone and a third loudspeaker of the telephone, and for selective connection of the fourth microphone and a fourth loudspeaker of the telephone.

9. A speech support system according to claim 8, wherein, by means of the speech support system, a tactile, optical and/or an acoustic confirmation of successful operation of operating element can be generated.

10. A speech support system for a vehicle comprising:
a first microphone,
a second microphone,
a third microphone,
a first loudspeaker,
a second loudspeaker,
a third loudspeaker,
a communication path control unit being operable to:
establish, for a speech support system, first communication paths from the first microphone to the second loudspeaker and the third loudspeaker, second communication paths are maintained from the second microphone to the first loudspeaker and the third loudspeaker, and third communication paths are maintained from the third microphone to the first loudspeaker and the second loudspeaker, and
in response to a telephone call from a telephone, the communication path control unit operable to switch any one, two, or all three of the microphones and loudspeakers from participation in the speech support system to participation in the telephone call, by means of the communication path control unit interrupting and replacing any of the first, second, and third communication paths with communication paths between the telephone and any one, two, or all three of the microphones and loudspeakers.

11. A speech support system according to claim 10, wherein the second microphone signal can be selectively output to the telephone and the telephone signal that can be output from the telephone can be output to the second loudspeaker, wherein the first microphone signal can be output to the third loudspeaker, but not to the second loudspeaker, and the third microphone signal can be output to the first loudspeaker, but not to the second loudspeaker.

12. A speech support system according to claim 10, wherein, the third microphone signal can alternately be output to the telephone and the telephone signal that can be output by telephone can be output to the third loudspeaker, wherein the first microphone signal can be output to the second loudspeaker, but not to the third loudspeaker, and the second microphone signal can be output to the first loudspeaker, but not to the third loudspeaker.

13. A speech support system according to claim 10, wherein the system includes an operating element for selective connection of the first microphone and the first loudspeaker to the telephone, for selective connection of the second microphone and the second loudspeaker to the telephone and/or for selective connection of the third microphone and a third loudspeaker of the telephone.

14. A speech support system according to claim 13, wherein, a tactile, optical and/or an acoustic confirmation of successful operation of operating element can be generated.

* * * * *